(12) United States Patent
Adams et al.

(10) Patent No.: US 9,944,042 B2
(45) Date of Patent: Apr. 17, 2018

(54) WATERPROOF BREATHABLE COMPOSITE MATERIALS FOR FABRICATION OF FLEXIBLE MEMBRANES AND OTHER ARTICLES

(71) Applicant: Cubic Tech Corporation, Mesa, AZ (US)

(72) Inventors: Christopher Michael Adams, Mesa, AZ (US); Roland Joseph Downs, Mesa, AZ (US); Keith Joel McDaniels, Phoenix, AZ (US)

(73) Assignee: CUBIC TECH CORPORATION, Mesa, AZ (US)

( * ) Notice: Subject to any disclaimer, the term of this patent is extended or adjusted under 35 U.S.C. 154(b) by 0 days.

(21) Appl. No.: 15/162,211

(22) Filed: May 23, 2016

(65) Prior Publication Data
US 2016/0339671 A1 Nov. 24, 2016

Related U.S. Application Data

(63) Continuation of application No. 14/309,578, filed on Jun. 19, 2014, now Pat. No. 9,358,755, which is a
(Continued)

(51) Int. Cl.
*B32B 5/12* (2006.01)
*B32B 3/26* (2006.01)
(Continued)

(52) U.S. Cl.
CPC .............. *B32B 5/12* (2013.01); *B32B 3/266* (2013.01); *B32B 5/022* (2013.01); *B32B 7/14* (2013.01); *B32B 27/12* (2013.01); *B32B 27/322* (2013.01); *B32B 27/40* (2013.01); *B32B 2250/02* (2013.01); *B32B 2250/03* (2013.01); *B32B 2250/04* (2013.01); *B32B 2262/0253* (2013.01); *B32B 2262/12* (2013.01); *B32B 2307/514* (2013.01); *B32B 2307/5825* (2013.01); *B32B 2307/724* (2013.01); *B32B 2307/7242* (2013.01); *B32B 2307/7265* (2013.01); *B32B 2437/00* (2013.01);
(Continued)

(58) Field of Classification Search
CPC .................................. B32B 5/12; B32B 3/266
USPC .......... 428/98, 102, 105, 107, 109, 110, 114
See application file for complete search history.

(56) References Cited

U.S. PATENT DOCUMENTS

| 6,071,834 A | * | 6/2000 | Martz | ................ A41D 31/0016 156/178 |
| 8,784,968 B2 | * | 7/2014 | Adams | .................... B32B 3/266 428/102 |
| 9,358,755 B2 | * | 6/2016 | Adams | .................... B32B 3/266 |

* cited by examiner

Primary Examiner — Brent T O'Hern
(74) Attorney, Agent, or Firm — Snell & Wilmer L.L.P.

(57) ABSTRACT

A waterproof breathable material has a higher strength-to-weight ratio and higher tear resistance-to-weight ratio than traditional materials, and may be applied in a wide field of potential uses. A non-woven composite material comprises at least one waterproof breathable (W/B) membrane, a first unidirectional non-woven composite layer having multiple fibers enclosed by adhesive in parallel to each other, a second unidirectional non-woven composite layer having multiple fibers enclosed in adhesive in parallel to each other. The first unidirectional non-woven composite layer is positioned such that the fibers are oriented 90° relative to the fibers of the second unidirectional non-woven composite layer, and a space is formed between the first and second multiple fibers. No adhesive is present in the space.

20 Claims, 10 Drawing Sheets

Related U.S. Application Data continuation of application No. 13/168,912, filed on Jun. 24, 2011, now Pat. No. 8,784,968.

(60) Provisional application No. 61/370,448, filed on Aug. 3, 2010, provisional application No. 61/358,394, filed on Jun. 24, 2010.

(51) Int. Cl.
| | | |
|---|---|---|
| *B32B 7/14* | (2006.01) | |
| *B32B 27/12* | (2006.01) | |
| *B32B 27/32* | (2006.01) | |
| *B32B 27/40* | (2006.01) | |
| *B32B 5/02* | (2006.01) | |

(52) U.S. Cl.
CPC ......... *B32B 2605/12* (2013.01); *Y10T 428/24* (2015.01); *Y10T 428/24033* (2015.01); *Y10T 428/24058* (2015.01); *Y10T 428/24074* (2015.01); *Y10T 428/24091* (2015.01); *Y10T 428/24099* (2015.01); *Y10T 428/24132* (2015.01); *Y10T 428/24802* (2015.01); *Y10T 442/643* (2015.04)

900

902 Fiber or Wire

903 W/B Polymer or Adhesive

−45° Orientation
+45° Orientation
90° Orientation
0° Orientation

WATERPROOF BREATHABLE COMPOSITE MATERIALS FOR FABRICATION OF FLEXIBLE MEMBRANES AND OTHER ARTICLES

CROSS-REFERENCE TO RELATED APPLICATIONS

This application is a Continuation Application of U.S. patent application Ser. No. 13/168,912 filed Jun. 24, 2011, which claims priority to U.S. Provisional Application No. 61/358,394, filed Jun. 24, 2010, and U.S. Provisional Application No. 61/370,448, filed Aug. 3, 2010, which are incorporated herein by reference in their entireties.

FIELD OF THE INVENTION

The application relates to Waterproof Breathable materials, particularly to an improved Waterproof Breathable material for a variety of uses and applications.

BACKGROUND OF THE INVENTION

In the prior art, a lamination process is used to bond Waterproof Breathable ("W/B") films or membranes (typically manufactured from PTFE or PU) to woven fabrics. The purpose of the woven materials, typically nylon or polyester, is to provide material properties, such as strength, stretch resistance and tear resistance to the laminate. The problem with the resulting W/B woven materials and randomly oriented non-woven W/B materials is that their heavy weight, low strength-to-weight ratio, excessive thickness and low tear resistance and rip stop properties limits the material's usefulness. Thus, a need exists for a material having a higher strength-to-weight ratio and higher tear resistance-to-weight ratio that may be applied in a wide field of potential uses.

SUMMARY OF THE INVENTION

A waterproof breathable material has a higher strength-to-weight ratio and higher tear resistance-to-weight ratio than traditional materials, and may be applied in a wide field of potential uses. A non-woven composite material comprises at least one waterproof breathable (W/B) membrane, a first unidirectional non-woven composite layer having multiple fibers enclosed by adhesive in parallel to each other, a second unidirectional non-woven composite layer having multiple fibers enclosed in adhesive in parallel to each other. The first unidirectional non-woven composite layer is positioned such that the fibers are oriented 90° relative to the fibers of the second unidirectional non-woven composite layer, and a space is formed between the first and second multiple fibers. No adhesive is present in the space.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF THE INVENTION

While exemplary embodiments are described herein in sufficient detail to enable those skilled in the art to practice the invention, it should be understood that other embodiments may be realized and that logical material, assembly, and mechanical changes may be made without departing from the spirit and scope of the invention. Thus, the following detailed description is presented for purposes of illustration only.

Waterproof Breathable composite materials provide the next generation in lightweight, high strength, flexible, Waterproof Breathable ("W/B") materials. In an exemplary embodiment, a W/B membrane (such as PTFE or urethane W/B material) is bonded to a Composite Material. As used herein, Composite Material is defined as one or more layers of unidirectional fiber and polymer matrix plies oriented in one or more directions. These membranes may be either waterproof but porous to gas and water vapor flow or they may be non porous but allow water vapor to move through the material via diffusion. In an exemplary embodiment, the Composite Materials are made from thinly spread high strength fibers such as Dyneema®, Vectran®, Aramid, polyester, other materials that are coated with adhesive or other material, or any combination thereof. The adhesive or other polymer used may be a W/B type of urethane polymer, though other non-urethane W/B materials or non-urethane non-W/B materials may also be suitable. The advantage of the exemplary Composite Materials is that the manufactured materials can be significantly thinner, more flexible, have better touch and feel characteristics, and are lighter than woven and randomly oriented nonwoven materials without sacrificing strength or other material properties. In an exemplary embodiment, a W/B Composite Material has a higher strength-to-weight ratio and tear resistance than other flexible W/B materials currently available on the market. Additionally, the exemplary Composite Material have limited impact on the breathability of the membrane because the areas between the fiber filaments, monofilaments, threads or tows are either free from gas permeability blocking polymer or contain a permeable W/B adhesive or film which allows gas breathability while preventing or inhibiting the flow of fluids. Tows are a fiber bundle with a plurality of monofilaments. The W/B membrane may or may not incorporate unidirectional reinforcing filaments, fibers, or tows.

Figure 1:
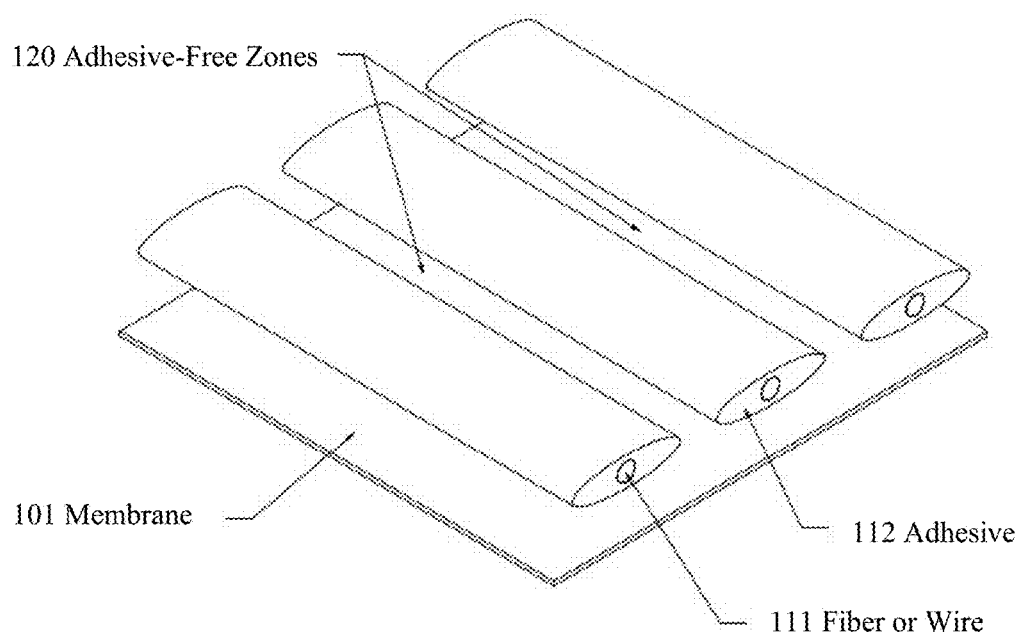
FIG. 1 illustrates an exemplary embodiment of a woven material having one-directional reinforced construction.

In an exemplary embodiment and with reference to FIG. 1, a non-woven layered composite 100 comprises at least one layer that is a W/B membrane 101 and at least one other layer that is a unidirectional non-woven composite 102. In one embodiment, non-woven composite 102 comprises multiple fibers 111 in parallel with each other. The fibers 111 are enclosed by adhesive 112 that forms a cover. Furthermore, fibers 111 of non-woven composite 102 are arranged such that spaces form that are adhesive-free zones 120. However, other suitable configurations of the non-woven layered composite material are also contemplated.

Figure 2:
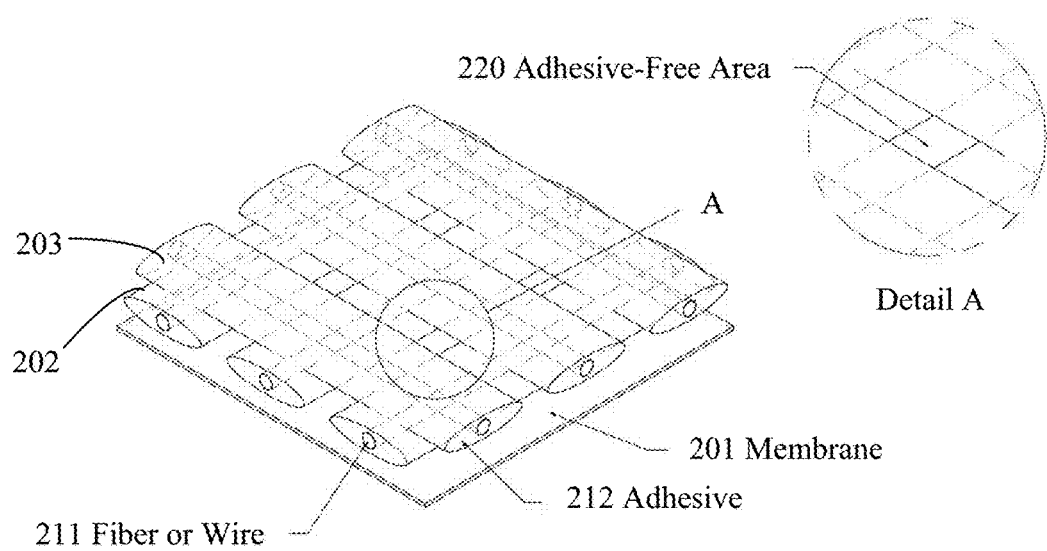
FIG. 2 illustrates an exemplary embodiment of a woven material having two-directional reinforced construction.

In another exemplary embodiment and with reference to FIG. 2, a non-woven W/B composite material 200 comprises at least one W/B membrane layer 201, a first unidirectional non-woven composite 202, and a second unidirectional non-woven composite 203. Similar to non-woven composite 102, non-woven composites 202, 203 individually comprise multiple fibers 211 in parallel with each other. The fibers 211 are enclosed by adhesive 212 that forms a cover. Moreover, non-woven composite 202 and non-woven composite 203 are oriented such that the respective fibers 211 are rotated 90° relative to the adjacent layer of fibers 211. This cross-hatch configuration of non-woven W/B composite material 200 forms spaces 220 through the layers that are adhesive-free zones.

Figure 3:
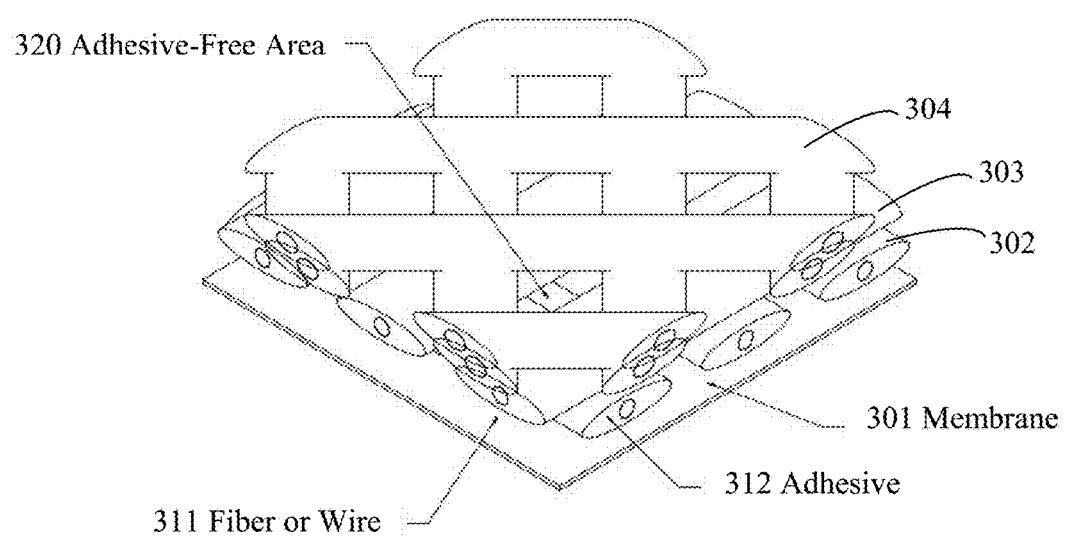
FIG. 3 illustrates an exemplary embodiment of a woven material having four-directional reinforced construction.

In yet another exemplary embodiment and with reference to FIG. 3, a non-woven W/B composite material 30 comprises at least one W/B membrane layer 31, a first unidirectional non-woven composite 302, a second unidirectional non-woven composite 303, and a third unidirectional non-woven composite 304. Similar to non-woven composites 102, 202, and 203, non-woven composites 302, 303, 304 individually comprise multiple fibers 311 in parallel with each other. The fibers 311 are enclosed by adhesive 312 that forms a cover. Moreover, non-woven composite layers 302, 303, 304 are oriented such that the respective fibers 311 are rotated 45° or 90° relative to the adjacent layer of fibers 311. This additional cross-hatch configuration of non-woven W/B composite material 300 forms spaces 320 through the layers that are adhesive-free zones. As is illustrated in FIG. 3, the adhesive-free zone spaces 320 in non-woven W/B composite material 300 are more restricted than in non-woven W/B composite material 200 due to the additional layer of overlap and additional off-set angle of the fibers 311.

Furthermore, in an exemplary embodiment, the material layers are combined and cured together using pressure and temperature either by passing the stacked layers through a heated set of nips rolls, a heated press, a heated vacuum press, a heated belt press or by placing the stack of layers into a vacuum lamination tool and exposing the stack to heat. Moreover, external pressure, such as provided by an autoclave, may also be used to increase the pressure exerted on the layers. The vacuum lamination tool may be covered with a vacuum bag sealed to the lamination tool with a vacuum applied to provide pressure. Other lamination methods may also be suitable as would be known to one skilled in the art.

The W/B composite material functions as a high strength-to-weight ratio barrier layer that permits the transfer of gas, including water vapor, through the materials but not the transfer of liquid water. Furthermore, in various embodiments, the exemplary W/B composite material may be used in but not limited to: sleeping bag shells, tent walls, and clothing. In one embodiment, a Composite Material, such as a unidirectional fiber reinforced tape, is bonded to a W/B membrane. A preferred embodiment of the exemplary material would be material consisting of an eVent W/B membrane bonded on one surface to Cubic Tech product CT1, thus creating a Cubic Tech product CTB1B3/NF. Various embodiments may include other configurations of W/B membranes, woven and non-woven fabrics and other materials produced by Cubic Tech.

In a first exemplary embodiment, one or more layers of a W/B membrane are bonded to both outer surfaces of a Cubic Tech laminate. The laminate may be of various different product weights, strengths, colors, and patterns. In a second exemplary embodiment, the Composite Material includes coloration of the matrix or membranes through use of pigments or dye sublimation. In a third exemplary embodiment, a fire retardant adhesive or polymer is used, or fire retardants can be added to a flammable matrix or membrane to improve the flame resistance. Examples of fire retardant additives include: DOW D.E.R. 593 Brominated Resin, Dow Corning 3 Fire Retardant Resin, and polyurethane resin with Antimony Trioxide (such as EMC-85/10A from PDM Neptec ltd.), although other fire retardant additives may also be suitable. Fire retardant additives that may be used to improve flame resistance include Fyrol FR-2, Fyrol HF-4, Fyrol PNX, Fyrol 6, and SaFRon 7700, although other additives may also be suitable. Fire retardancy and self extinguishing features can also be added to the fibers either by using fire retardant fibers such as Nomex or Kevlar, ceramic or metallic wire filaments, direct addition of fire retardant compounds to the fiber formulation during the fiber manufacturing process, or by coating the fibers with a sizing, polymer or adhesive incorporating fire retardant compounds listed above or others as appropriate. Any woven or scrim materials used in the laminate may be either be pretreated for fire retardancy by the supplier or coated and infused with fire retardant compounds during the manufacturing process.

In a fourth exemplary embodiment, the material further comprises hybrid layup plys or hybrid stacks to modify or improve various mechanical properties of the material. Hybrid plys are defined as the usage of at least 2 (two) non-matrix elements (various fiber types, wire, meshes, etc) within a single ply that make up the composite. A hybrid stack is defined as the usage of unique separate plys, each containing at least 1 (one) non-matrix element that is different than at least one adjacent ply. The non-matrix element, for example, may be various fiber types, fiber coated or plated with metals or oxides, wire monofilaments, wire meshes, and the like. In a fifth exemplary embodiment, a composite W/B material comprises a woven or non-woven cloth or leather on one or both sides. In a sixth exemplary embodiment, the W/B composite comprises a compatible adhesive on one or both sides for lamination to third party fabrics (woven, nonwoven, leathers) to upgrade the strength, tear resistance (rip stop) and add W/B properties to the third party fabrics. In a seventh embodiment, the W/B composite further adds anti-microbial/anti-pathogen resistance by the incorporation of one or more if anti-microbial agents added or coated onto the polymer resins, film or fabrics, and anti-microbial treatments to the fibers, monofilaments, threads or tows used for composite material. Typical materials include OxiTitan Antimicrobial, and nana silver compounds, Sodium pyrithione, Zinc pyrithione 2-Fluoroethanol, 1-Bromo-2-fluoroethane, Benzimidazole, Fleroxacin, 1,4-Butanedisulfonic acid disodium salt, 2-(2-pyridyl)isothiourea N-oxide hydrochloride, Quarternary ammonium salt, 2-Pyridinethiol 1-oxide, Compound zinc pyrithione, Compound copper pyrithione, magnesium pyrithione, BISPYRITHIONE, pyrithione, α-Bromo Cinnam-Gel, KFO ABC Silica Gel manufactured. Fiber forms such as threads, tows and monofilaments can be treated with silver nano particles, or can have silver coatings applied via chemical or electrical plating, vacuum deposition or coating with a silver compound containing polymer, adhesive or sizing. The antimicrobial/anti-pathogen materials may also be suitable.

Figure 4:
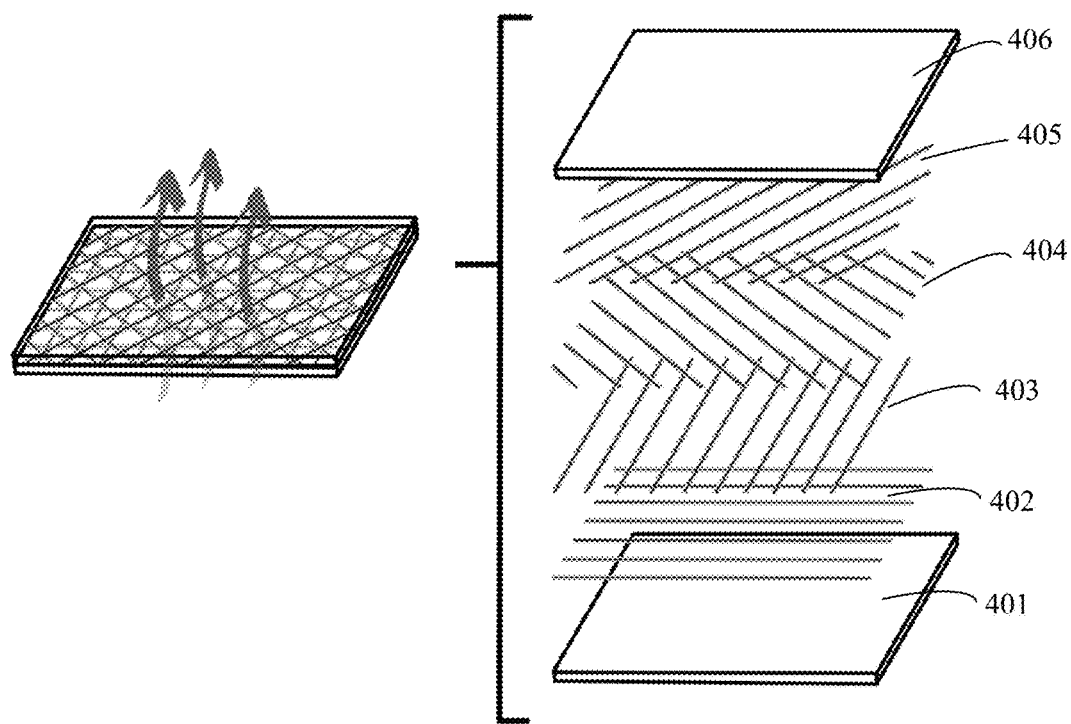
FIG. 4 illustrates an exploded view of an exemplary embodiment of a woven material having four-directional reinforced construction and a bias ply reinforcement layer and a fabric top layer.

Traditional W/B materials are constructed or laminated to woven base fabrics. In contrast, in an exemplary embodiment and with reference to FIG. 4, a W/B Composite Material 400 may comprise at least one layer of fibers 402, 403, 404, 405 bonded to at least one of a first membrane layer 401 and a second membrane layer 406. Fibers 402, 403, 404, 405 may be either a membrane or a fabric layer. Layers 401, 406 may be either membranes, fabric layers, or ply reinforcement layers. In some embodiments, only a single membrane or fabric layer is included. In another exemplary embodiment, a W/B composite material comprises only reinforced fiber plies, and excludes one or both membrane or fabric layers. In an exemplary embodiment, at least one layer of fibers is a flexible non-woven composite made from unidirectional fiber/matrix tape. Furthermore, at least one type of fiber may comprise a single fiber layer or multiple fiber layers. In addition, the fiber layers can be at any orientation relative to other fiber layers. For example, FIG. 2 illustrates two layers of fibers with orientations of 0° and 90° relative to an axis in a membrane layer. FIGS. 3 and 4 illustrate exemplary embodiments of four layers of fibers with orientations of 0°, 90°, −45°, and +45° relative to an axis in a membrane layer. The spread fibers are arranged such that the fiber's filaments form "windows" facilitating breathability and gas permeability. In other words, the filaments have a controlled spacing that results in gaps between the filaments of each fiber layer and the gaps of each fiber layer align with fiber filament gaps of the adjacent fiber layer to form a pass-through hole (window). In one embodiment, the filament spacing in each fiber layer may be in the range of about one micrometer to about one centimeter. In accordance with an exemplary embodiment, the size of the gas permeable filament window is at least as large as the pores in the W/B membrane. The filament windows and the pores in the W/B membrane allow gas or water vapor to transfer through the material. In other words, an exemplary Composite Material creates grids of "windows" between the filaments, which in turn creates a semi-porous material.

A W/B Composite Material comprising a unidirectional fiber/matrix tape may utilize a resin or other adhesive to bond the materials together. In accordance with an exemplary embodiment, the flexible non-woven composite includes controlled adhesive content for optimized adhesive control. In an exemplary embodiment using either a non-W/B adhesive or a W/B adhesive, the adhesive content of the flexible non-woven composite is of sufficient amount to adhere to other layers but not a sufficient amount to form a continuous layer. Described another way, the amount of resin adhesive on the flexible non-woven composite does not cover the "windows" in the fiber layers but instead leaves the desired gap. The amount of controlled adhesive applied in each material is dependent on the characteristics of the material layers. Some materials need more adhesive to create a bond in comparison to other materials.

Figure 5:
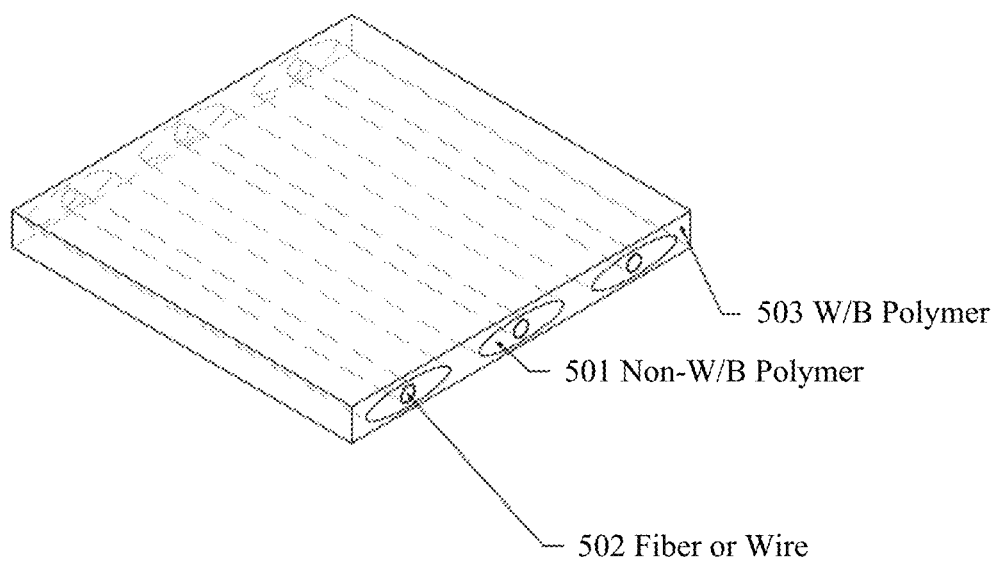
FIG. 5 illustrates an exemplary embodiment of a woven material having one-directional reinforced construction with a non-W/B polymer coating the fibers and embedded in a W/B polymer.
Figure 6:
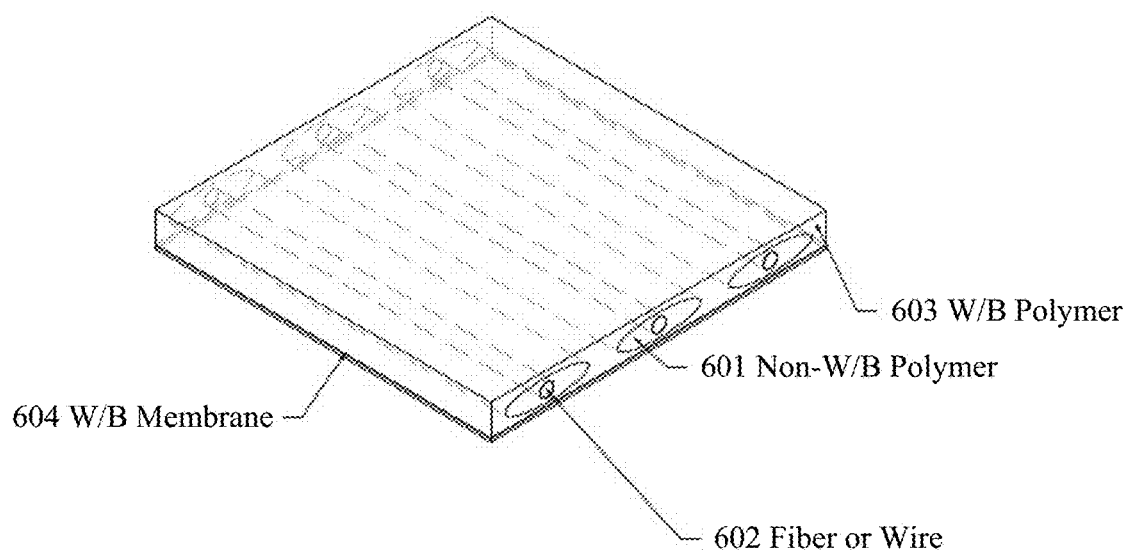
FIG. 6 illustrates an exemplary embodiment of a woven material having one-directional reinforced construction with a non-W/B polymer coating the fibers and embedded in a W/B polymer; and bonded to a W/B membrane.
Figure 7:
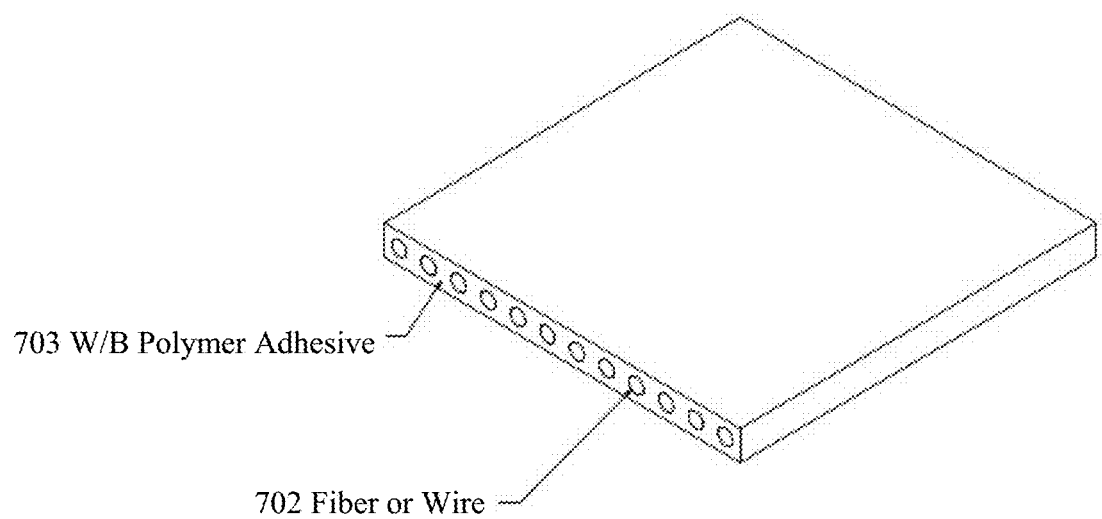
FIG. 7 illustrates an exemplary embodiment of a woven material having one-directional reinforced construction with the fibers embedded in a W/B polymer.
Figure 8:
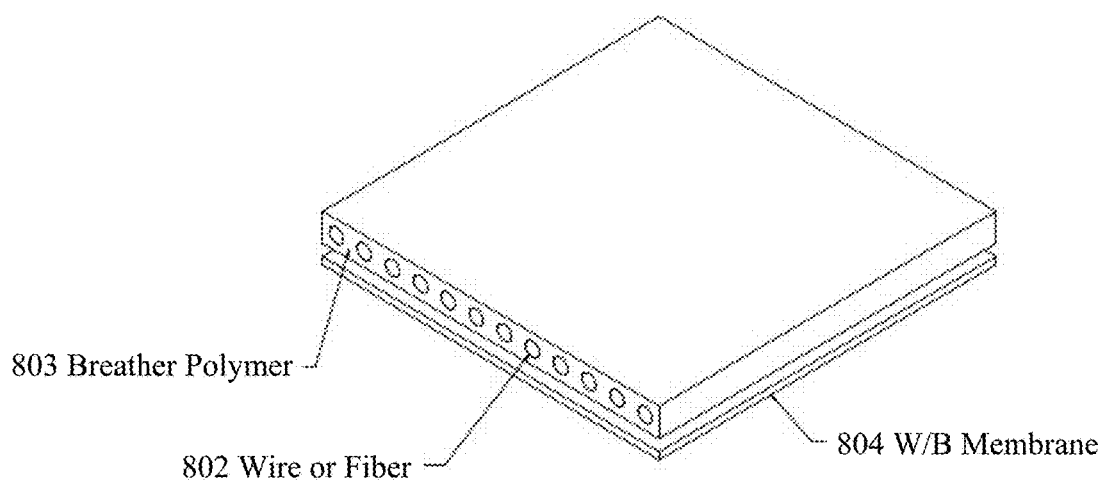
FIG. 8 illustrates an exemplary embodiment of a woven material having one-directional reinforced construction with the fibers embedded in a W/B polymer and bonded to a W/B membrane.
Figure 9:
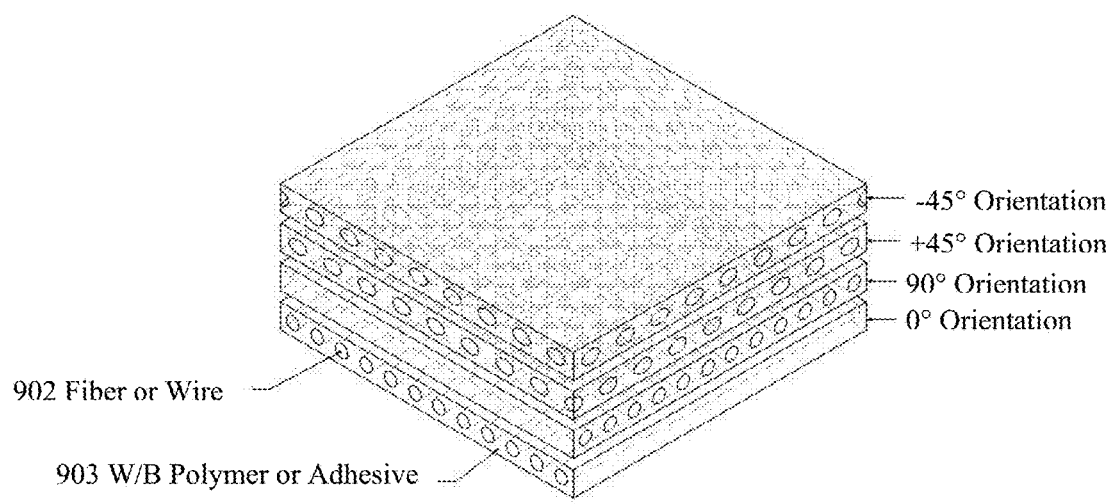
FIG. 9 illustrates an exemplary embodiment of a woven material having four-directional reinforced construction with the fibers embedded in a W/B polymer.
Figure 10:
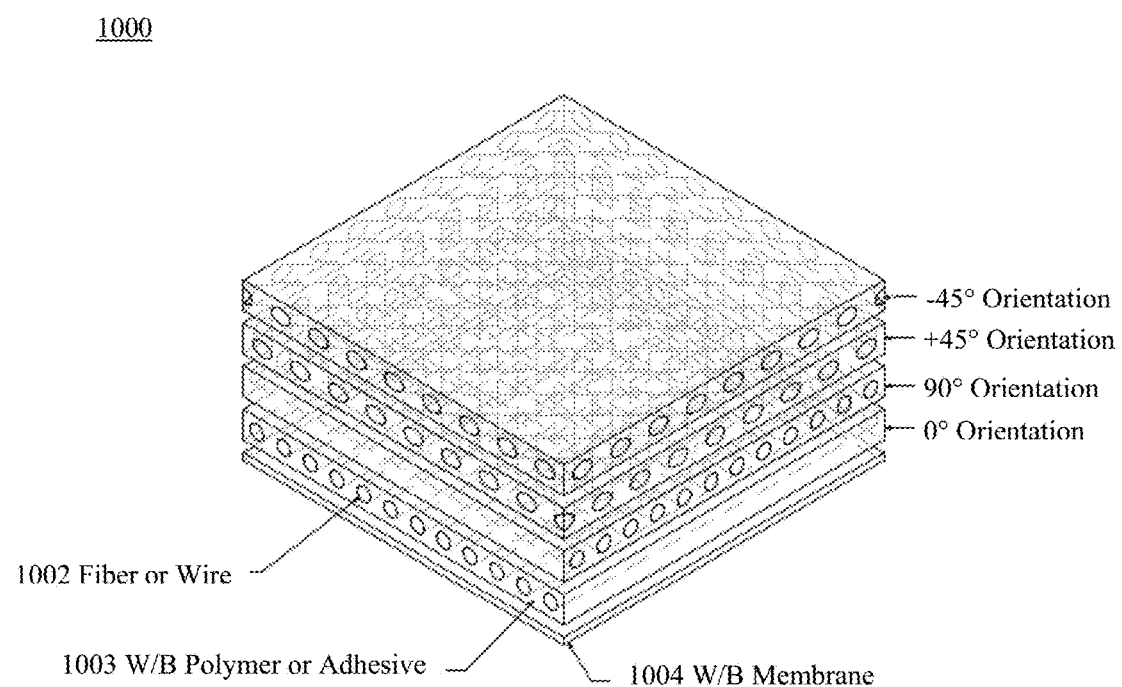
FIG. 10 illustrates an exemplary embodiment of a woven material having four-directional reinforced construction with the fibers embedded in a W/B polymer and bonded to a W/B membrane.

In another exemplary embodiment, a W/B adhesive is used to bond the materials and the W/B adhesive may cover the "windows" while maintaining the breathable functionality of the material. For example, FIG. 5 references an embodiment of a non-W/B polymer 501 coating the filaments 502 and a W/B polymer 503 filling the empty spaces or windows. Furthermore, in one embodiment and with reference to FIG. 6, a non-W/B polymer 601 coats the filaments 602, a W/B polymer 603 fills the empty spaces or windows, and a W/B membrane 604 is bonded to W/B polymer 603. FIG. 7 illustrates an embodiment having filaments 702 embedded in a W/B polymer 703. Additionally, FIG. 8 references an embodiment having filaments 802 embedded in a W/B polymer 803 and also bonded to a W/B membrane 804. The embodiments referenced in FIGS. 5, 6, 7, and 8 may include other layers of coated fibers, W/B membranes, woven fabrics or other suitable materials. FIGS. 9 and 10 are examples of such embodiments that include multiple layers.

In an exemplary embodiment and with reference to FIG. 9, a multidirectional reinforced W/B material 900 comprises fibers 902 embedded in a W/B polymer 903. Multiple layers of fibers 902 and W/B polymer 903 are stacked at designed orientations of 0°, 90°, +45°, and −45° relative to an axis in a membrane layer. Moreover, FIG. 10 references an embodiment of a multidirectional reinforced W/B material 1000 comprising fibers 1002 embedded in a W/B polymer 1003 and also bonded to a W/B membrane 1004. Similar to multidirectional reinforced W/B material 900, multidirectional reinforced W/B material 1000 comprises multiple layers of fibers 902 and W/B polymer 903 stacked at designed orientations of 0°, 90°, +45°, and −45° relative to an axis in a membrane layer. One example of a suitable W/B adhesive is thermoplastic polyurethane (TPU) but other materials are also suitable.

Additional details with regards to material, process, methods and manufacturing, refer to U.S. Pat. No. 5,470,632, entitled "COMPOSITE MATERIAL FOR FABRICATION OF SAILS AND OTHER ARTICLES," which was issued on Nov. 28, 1995, and U.S. Pat. No. 5,333,568, entitled "MATERIAL FOR THE FABRICATION OF SAILS," which was issued on Aug. 2, 1994; the contents of which are hereby incorporated by reference for any purpose in their entirety.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:
1. A non-woven composite material comprising:
a first unidirectional fiber reinforced layer comprising a first set of parallel fibers embedded in a waterproof/breathable polymer, said first set of parallel fibers enclosed by a non-waterproof/breathable adhesive;

a second unidirectional fiber reinforced layer comprising a second set of parallel fibers embedded in a waterproof/breathable polymer, said second set of parallel fibers enclosed by a non-waterproof/breathable adhesive; and at least one waterproof/breathable membrane bonded to said first or second unidirectional fiber reinforced layers, said membrane comprising pores allowing transfer of gas or water vapor through said membrane, wherein said first and second unidirectional fiber reinforced layers are oriented and bonded together such that said first and second sets of parallel fibers are directionally offset relative to one another to create windows allowing transfer of gas or water vapor through said unidirectional fiber reinforced layers;

wherein said windows are absent said non-waterproof/breathable adhesive; and wherein said windows are at least as large as said pores.

2. The non-woven composite material of claim 1, wherein said first and second sets of parallel fibers are directionally offset at 90° relative to one another.

3. The non-woven composite material of claim 1, further comprising at least one layer of woven or non-woven fabric.

4. The non-woven composite material of claim 1, comprising two waterproof/breathable membrane layers, one bonded to said first unidirectional fiber reinforced layer, the other bonded to said second unidirectional fiber reinforced layer.

5. The non-woven composite material of claim 2, further comprising a third unidirectional fiber reinforced layer comprising a third set of parallel fibers embedded in a waterproof/breathable polymer, said third set of parallel fibers enclosed by a non-waterproof/breathable adhesive, wherein spaces between said fibers are absent said non-waterproof/breathable adhesive; and wherein said third unidirectional fiber reinforced layer is oriented and bonded to any one of said first and second unidirectional fiber reinforced layers such that said third set of parallel fibers is directionally offset relative to said first and second sets of parallel fibers, and said spaces align with said windows.

6. The non-woven composite material of claim 5, wherein said third and first sets of parallel fibers are directionally offset at 45° relative to one another.

7. A sleeping bag shell, tent wall or clothing comprising the non-woven composite of claim 1.

8. The non-woven composite material of claim 1, wherein said fibers comprise extended chain polyethylene.

9. A non-woven composite material comprising:
a first unidirectional fiber reinforced layer comprising a first set of parallel fibers embedded in a waterproof/breathable polymer, said first set of parallel fibers enclosed by a non-waterproof/breathable adhesive;

a second unidirectional fiber reinforced layer comprising a second set of parallel fibers embedded in a waterproof/breathable polymer, said second set of parallel fibers enclosed by a non-waterproof/breathable adhesive; and at least one waterproof/breathable membrane bonded to ether one of said first or second unidirectional fiber reinforced layers, said membrane comprising pores allowing transfer of gas or water vapor through said membrane, wherein said first and second layers are oriented and bonded together such that said first and second sets of parallel fibers are directionally offset relative to one another to create windows allowing transfer of gas or water vapor through said first and second unidirectional fiber reinforced layers;

wherein said windows are filled with said waterproof/breathable polymer, and wherein said windows are at least as large as said pores.

10. The non-woven composite material of claim 9, wherein said first and second sets of parallel fibers are directionally offset at 90° relative to one another.

11. The non-woven composite material of claim 9, further comprising at least one layer of woven or non-woven fabric.

12. The non-woven composite material of claim 9, comprising two waterproof/breathable membrane layers, one bonded to said first unidirectional fiber reinforced layer, the other bonded to said second unidirectional fiber reinforced layer.

13. The non-woven composite material of claim 10 further comprising a third unidirectional fiber reinforced layer comprising a third set of parallel fibers embedded in a waterproof/breathable polymer, said third set of parallel fibers enclosed by a non-waterproof/breathable adhesive, wherein spaces between said fibers are absent said non-waterproof/breathable adhesive; and wherein said third unidirectional fiber reinforced layer is oriented and bonded to any one of said first and second unidirectional fiber reinforced layers such that said third set of parallel fibers is directionally offset relative to said first and second sets of parallel fibers, and said spaces align with said windows.

14. The non-woven composite material of claim 13, wherein said third and first sets of parallel fibers are directionally offset at 45° relative to one another.

15. A sleeping bag shell, tent wall or clothing comprising the non-woven composite of claim 9.

16. The non-woven composite material of claim 9, wherein said fibers comprise extended chain polyethylene.

17. A non-woven composite material comprising:
a first unidirectional fiber reinforced layer comprising a first set of parallel fibers embedded in a waterproof/breathable polymer;

a second unidirectional fiber reinforced layer comprising a second set of parallel fibers embedded in a waterproof/breathable polymer; and at least one waterproof/breathable membrane bonded to ether one of said first or second unidirectional fiber reinforced layers, said membrane comprising pores allowing transfer of gas or water vapor through said membrane, wherein said first and second layers are oriented and bonded together such that said first and second sets of parallel fibers are directionally offset 90° relative to one another to create grids of windows allowing transfer of gas or water vapor through said first and second unidirectional fiber reinforced layers;

wherein said windows are filled with said waterproof/breathable polymer, and wherein said windows are at least as large as said pores.

18. The non-woven composite material of claim 17, further comprising at least one layer of woven or non-woven fabric.

19. The non-woven composite material of claim 17, comprising two waterproof/breathable membrane layers, one bonded to said first unidirectional fiber reinforced layer, the other bonded to said second unidirectional fiber reinforced layer.

20. The non-woven composite material of claim 17, further comprising a third unidirectional fiber reinforced layer comprising a third set of parallel fibers embedded in a waterproof/breathable polymer, wherein said third unidirectional fiber reinforced layer is bonded to any one of said first and second unidirectional fiber reinforced layers such that said third set of parallel fibers is directionally offset 45° relative to said first set of parallel fibers, and said spaces align with said windows.

* * * * *